(12) United States Patent
Qi (10) Patent No.: US 9,403,718 B2
(45) Date of Patent: Aug. 2, 2016

(54) PROCESS FOR CALCINING BLENDING MATERIAL WITH HIGH ACTIVITY BY FEEDING OUTSIDE KILN HEAD AND APPARATUS THEREOF

(75) Inventor: Zhengliang Qi, Hangzhou (CN)

(73) Assignee: Luzhou Landlong Cement Co., Ltd. (CN)

( * ) Notice: Subject to any disclaimer, the term of this patent is extended or adjusted under 35 U.S.C. 154(b) by 106 days.

(21) Appl. No.: 14/360,874

(22) PCT Filed: May 22, 2012

(86) PCT No.: PCT/CN2012/075900
§ 371 (c)(1),
(2), (4) Date: May 27, 2014

(87) PCT Pub. No.: WO2013/078839
PCT Pub. Date: Jun. 6, 2013

(65) Prior Publication Data
US 2014/0318420 A1 Oct. 30, 2014

(30) Foreign Application Priority Data

Nov. 28, 2011 (CN) .......................... 2011 1 0385259

(51) Int. Cl.
*C04B 7/43* (2006.01)
*C04B 7/24* (2006.01)
(Continued)

(52) U.S. Cl.
CPC ... *C04B 7/43* (2013.01); *C04B 7/24* (2013.01);
*C04B 7/28* (2013.01); *C04B 7/30* (2013.01);
*C04B 7/4407* (2013.01); *F27B 7/33* (2013.01);
*F27B 7/383* (2013.01); *F27D 15/0213*
(2013.01); *Y02P 40/145* (2015.11)

(58) Field of Classification Search
CPC ........................................................ C04B 7/43
See application file for complete search history.

(56) References Cited

U.S. PATENT DOCUMENTS 5,494,515 A * 2/1996 Young ........................ C04B 7/17
106/745
5,837,052 A * 11/1998 Oates ........................ C04B 7/47
106/705

(Continued)

FOREIGN PATENT DOCUMENTS

CN 1236748 A 12/1999
CN 1370750 A 9/2002
(Continued)

OTHER PUBLICATIONS

English Abstract of CN 1236748 A (1 page).
(Continued)

*Primary Examiner* — Paul Marcantoni
(74) *Attorney, Agent, or Firm* — Lewis Roca Rothgerber Christie LLP (57) ABSTRACT

Disclosed is a process for calcining active blending material involving feeding material outside of a kiln head and the blending material obtained. The process comprises feeding material from outside of kiln head of rotary kiln into inside of kiln hood and to grate cooler, wherein the material is coal gangue, shale, clay, peat, mud and the like which can form active cement component through low temperature calcining, and calcining the material at low temperature. Disclosed also is a cement production apparatus for carrying out the process provided, comprising feeder nose(s) provided on the kiln hood and/or grate cooler for feeding the material.

12 Claims, 2 Drawing Sheets

(51) Int. Cl.
  *C04B 7/44* (2006.01)
  *C04B 7/28* (2006.01)
  *C04B 7/30* (2006.01)
  *F27B 7/33* (2006.01)
  *F27B 7/38* (2006.01)
  *F27D 15/02* (2006.01)

(56) References Cited

U.S. PATENT DOCUMENTS 5,976,243 A * 11/1999 Oates ................ C04B 7/147
                                                          106/707
6,391,105 B1 * 5/2002 Oates ................ C04B 7/48
                                                          106/705

FOREIGN PATENT DOCUMENTS

CN 1436745 A 8/2003
CN 102070308 A 5/2011
CN 102211886 A 10/2011

OTHER PUBLICATIONS

English Abstract of CN 1370750 A (1 page).
English Abstract of CN 1436745 A (1 page).
International Search Report for Application No. PCT/CN2012/075900, issued on Sep. 6, 2012, with English Translation (6 pages).
Partial Translation of CN 102070308 A (1 page).
Partial Translation of CN 102211886 A (2 pages).

* cited by examiner

PROCESS FOR CALCINING BLENDING MATERIAL WITH HIGH ACTIVITY BY FEEDING OUTSIDE KILN HEAD AND APPARATUS THEREOF

CROSS-REFERENCE TO RELATED APPLICATION(S)

This application is a National Phase Patent Application and claims priority to and benefit of International Application Number PCT/CN2012/075900, filed on May 22, 2012, which claims priority to and benefit of Chinese Patent Application Number 201110385259.9, filed on Nov. 28, 2011, the entire disclosures of which are incorporated herein by reference.

FIELD OF THE INVENTION

The present invention relates to a cement producing process. Specifically, the present invention relates to a process with significant improvement for producing cement clinker in rotary cement kiln, i.e. a production process for increasing cement output by calcining blending material with high activity via "second feeding and calcining" outside kiln head. The present invention also relates to a simple and convenient, and energy saving and efficient production process with low cost for increasing cement output by calcining waste residue of industrial and mineral industry as materials. Meanwhile, the present invention also relates to a process for increasing energy use efficiency, decreasing coal consumption in cement clinker production, and increasing capacity of waste heat power generation in the production of cement clinker. In addition, the present invention also relates to an apparatus for carrying out the processes of the present invention.

DISCUSSION OF RELATED ART

Cement is powder hydraulicity inorganic bond material and the material with most wide usage and largest consumption in present construction industry, which may be formed to be slurry after agitation with water and can solidly cement the materials like sand, stone, steel, etc., and harden them in air or water. In spite of the low price, cement occupies important share in construction cost due to the low price and huge consumption.

In recent years, cement industry in China has been rapidly developed with the development of social economy, and its production and consumption take about 45% of the total quantity in the world. The cement output of China reached 1.88 billion tons in 2010 with a large development space.

At present, dry/wet process rotary kiln production process and preheating decomposition technique outside kiln are generally adopted in cement industry of China. Take silicate cement as an example, its process generally may be generalized to be "two grinding and one calcining", i.e. raw material preparation, clinker calcining, and cement grinding. Raw material preparation refers to the formation of raw material suitable for sintering system via physical treatment of limestone, clay, other auxiliary raw materials, etc., such as crushing and grinding. Clinker calcining comprises the procedures of preheating decomposition outside kiln and calcining inside kiln, etc. The raw material after being preheated and decomposed is sent into rotary kiln for high-temperature calcinations with a sintering temperature about 1250° C. (degree Celsius) to 1450° C. to achieve sintering of clinker. The high-temperature clinker after being sintered is unloaded from kiln head, and is conveyed to storage area or clinker mill after being cooled via clinker cooler like grate cooler, etc. "Cement grinding" is the last procedure in cement production, which means the cement finished products are finally formed via grinding the powder like cement clinker, blending material and necessary performance adjusting material/gelatinizer, etc. into suitable granularity. Moreover, most cement production lines are provided with hot-wind utilization and waste heat power generation apparatuses.

In above production process, what need to be particularly pointed out is that the clinker after about 1250° C. to 1450° C. sintering keeps high temperature, and the temperature of the unloaded material from the kiln head is generally about 900 C to 1200 C. Generally, in order to guarantee the mineral activity of clinker component, so as to guarantee the quality of the finished cement products, the temperature of the clinker after being calcined should be rapidly decreased via quenching. Therefore, grate cooler or other cooling apparatus generally will be adopted to cool the clinker. For example, cool air is blown in via grate cooler from down to up. Generally, in order to sufficiently utilize the high-temperature energy, the $1^{st}$ segment and the $2^{nd}$ segment of the cooling air of the grate cooler after being heated by the clinker will reach an average temperature of about 900° C. Part of them is extracted for being sent into the calcining area of the rotary kiln, and the other part is extracted for entering the decomposer outside the kiln, for the calcination of cement clinker and decomposition of cement raw material respectively. The average temperature of the $3^{rd}$ segment of the cooling air of the grate cooler is about 400° C. for waste heat power generation and/or coal mill heat source, etc. But even so, the heat of the calcined clinker itself also has not been sufficiently utilized. For example, the control process and its apparatus of the air pickup process of the kiln head waste heat boiler in dry process cement waste heat disclosed in CN101407382A relates to an air pickup technique in 600° C. to 200° C. area of the grate cooler via controlling and adjusting clinker temperature, clinker flow rate, clinker grain diameter, material thickness, grate cooler speed and air volume/air speed, etc.

In addition, in current cement production process, materials of industrial waste residue, slag, mining waste, etc., like coal ash, coal gangue, blast furnace slag, carbide slag, etc. are generally used in cement raw material preparation and blending material application in order to decrease environment pollution, lower the cost and increase cement output. The current technologies even relate to cement production processes directly utilizing a large amount of materials like industrial waste residue, slag, mining waste, etc. For example, CN1072159A discloses a process of low-temperature calcinations of cement clinker. This process uses the industrial waste of coal ash, coal gangue, steel slag, fault coal, etc. and adopts fluidized bed roaster or fluidized bed to calcine and form cement clinker from 950° C. to 1100° C. However, this process requires the raw material grinding 0.08 screen residue to be not larger than 10%, and adopts fluidized bed roaster or fluidized bed. A low-temperature cement production process is disclosed in CN1057821A. This process produces cement clinker with coal gangue and quick lime as main raw materials via ordinary pressure steam-curing and fluidized bed calcinations during 750° C. to 850° C. The main problem with this process is that long-time steam-curing is required for raw material composition at 100° C. for 4 to 10 hours with seed crystal added. Large scale application of this process is hard to be realized due to restrictions of long-time steam-curing, limited capacity of fluidized bed, etc. CN1546410A also discloses a similar process for composite cement production with utilization of large amount of coal gangue. This process requires calcining raw material composition after being grinded in calcining furnace at high temperature with a calcining temperature from 600° C. to 1000° C. for 1.5 to 2.5 hours with alkali metal or alkaline earth excitant. CN1124724A also discloses a cement admixture production process with the utilization of coal gangue, etc. and adoption of vertical calcining kiln at 1000° C. to 1500° C. calcining. This process requires high-temperature calcining for 6 to 10 hours with water cooling for the sintered feed.

It may be seen from above mentioned that people carried out large amount of exploration and practice on aspect of cement production with the materials of industrial waste residue, slag, mining wastes, etc. in cement industry field, but these processes generally require special calcining apparatus and/or steam curing apparatuses, special production line, adding of seed crystal or excitant, as well as the implementation conditions like raw material grinding, etc. All these factors result in low cement production efficiency, unstable quality, and large energy consumption, most importantly, and all these processes fail to be blended or combined with the prevailing dry/wet process rotary kiln production process, therefore it may not be widely applied and promoted.

SUMMARY OF THE INVENTION

For above existing technical problems, the present invention aims to provide a process for increasing cement output, wherein the process utilizes cement clinker line including rotary kiln and incorporates "feeding material from the outside for calcining", obtaining the calcined high performance blending material.

Another purpose of the present invention is to provide a simple and convenient, and energy saving and efficient process for increasing cement output by using waste residue of industrial and mineral industry.

Another purpose of the present invention is to provide a process for increasing energy utilization efficiency, reducing coal consumption in cement clinker production, and increasing capacity of waste heat power generation in the production of cement clinker.

Another purpose of the present invention is to provide an apparatus for carrying out the above production processes for calcining high activity blending material, and to provide the reconstruction of relevant apparatuses in production line.

Another purpose of the present invention is to provide cement clinker and cement produced by carrying out the above production processes.

Terms relate to the present invention are defined as follows in order to facilitating understanding the technical scheme of the present invention:

Term "second feeding and calcining" of the present invention refers to, compared with the conventional raw material feeding and clinker calcining inside of the rotary kiln, in the process of the present invention, material or material composition (preferably with certain thermal value) which can form active cement component through low temperature calcination is fed from outside of the kiln head of the rotary kiln, and then the material or material composition and the high temperature clinker unloaded from the kiln head are calcined with the temperature of the clinker. The second feeding and calcining do not occur inside of the rotary kiln, but inside of the kiln hood and grate cooler which are outside of the rotary kiln head. Therefore, compared with the feeding and calcining inside of the rotary kiln, the feeding and calcining involved in the present invention is defined as "second feeding and calcining", and the material fed is defined as "material for second feeding and calcining" or "material for second feeding".

Term "outside of the kiln head" used in the present invention refers to outside of the kiln head of the body of the rotary kiln, and where generally devices like kiln hood, grate cooler, etc. are arranged.

High temperature clinker unloaded from the kiln head is called "unloaded material". The increased cement output of the present invention actually refers to the obtained cement clinker, including the "unloaded material" through high temperature calcining in the rotary kiln and high activity blending material formed through "second feeding and calcining" "outside of the kiln head".

"High temperature calcining" of the present invention refers to the general sintering temperature of rotary kiln calcining from about 1250° C. to 1450° C. The temperature of the second calcining or lower calcining temperature or low calcining temperature should not be higher than 1100° C., generally from about 800° C. to 1100° C.

"Blending material" of the present invention refers to the material obtained through second calcining.

"Cement clinker admixture" of the present invention refers to the mixture of the material through second calcining and the clinker unloaded from the kiln head.

Specifically, the technical scheme of the present invention is as follows:

On the first aspect, a process for calcining active blending material involving feeding material outside of a kiln head is provided, comprising the following procedure:

while the clinker upon high temperature calcining in a rotary kiln entering a grate cooler via a kiln hood, feeding material from outside of a kiln head for the second time, wherein the material can form active cement component through low temperature calcining, and calcining the material at low temperature.

In the above process, if the material for feeding has thermal value, the heat produced during calcining can be used for increasing the secondary and thirdly air temperature as well as for power generation, therefore the present process may has a technical effect on saving coal and increasing waste heat power generating capacity. Therefore the process of the present invention is also a process for saving coal and increasing waste heat power generating capacity.

In the above process, "feeding material outside of a kiln head" is feeding material at the kiln hood and/or at a position on the grate cooler adjacent to the kiln hood.

In the above process, the material is the material which can form active cement component through calcining at a temperature from 700° C. to 1200° C., and which thermal value is from 0 KJ/kg to 12000 KJ/kg, preferably 100 KJ/kg to 12000 KJ/kg;

preferably, the maximum grain diameter of the material is less than 5 cm, preferably less than 2 cm.

Generally, the material comprise a first raw material which is one or more selected from coal gangue, oil shale, stone coal, clay, river and lake mud, shale, waste muck, sludge of sewage treatment plant and peat, preferably is one or more selected from coal gangue, shale, stone coal and peat, more preferably is coal gangue.

Moreover, the material further comprises a second raw material with a high thermal value, for supplementing the insufficiency of the thermal value of the first raw material so as to increase the thermal value of the material;

In addition, the material also may comprise a third raw material with a high calcium value, for supplementing the insufficiency of the calcium value of the first raw material so as to increase the calcium value of the material.

In the above process, the second raw material is one or more selected from fault coal, waste coke, peat and waste graphite. The third raw material is carbide slag.

The material is fed from outside of the kiln head, and the feeding amount of the material is 1% to 100% by weight, preferably 5% to 70% by weight of the clinker upon high temperature calcining in the rotary kiln.

The material fed can form active cement component through calcining at lower temperature from 700° C. to 1200° C., preferably from 750° C. to 1100° C.

On the second aspect, a cement clinker admixture produced according to the above process is provided.

On the third aspect, a cement production apparatus including a rotary kiln for increasing cement output and thermal energy utilization rate is provided. The production apparatus comprise a rotary kiln (12), a kiln hood (11), and a grate cooler (9), wherein a feeder nose (16) is provided on the body of the kiln hood (11) outside of the rotary kiln head (18) and/or on the grate cooler (9) for feeding material into inside of the kiln hood and grate cooler.

In addition, one or more feeder noses (16) can be provided and they are provided at the side and/or top of the body of the kiln hood (11) and on the grate cooler.

Preferably, the production apparatus may further comprise a material conveying device for conveying the material to be fed to the feeder nose (16).

The details of the present invention are as follows:

Above purposes of the present invention are realized via adoption of the following techniques:

The sintering temperature of the clinker obtained through clinker sintering according to the current rotary kiln cement production process is as above mentioned about 1250° C. to 1450° C. The clinker after high temperature calcining is unloaded through the kiln head and enters the kiln hood and grate cooler during which the temperature of the unloaded material temperature is about 900° C. to 1200° C. The conventional cement production process is to adopt a grate cooler for cooling the clinker to about 200° C. and send the clinker for storage or cement grinding. Of course, it also may comprise extracting hot air from the upper part of the grate cooler for high temperature calcining and pre-decomposition outside of the kiln, as well as for waste heat power generation. By contrast, the cement production process of the present invention is that, the temperature of the high temperature clinker unloaded from the kiln head can is fully used, i.e. the heat from the high temperature clinker is used to calcine the material (with certain thermal value) fed from outside of a kiln head, wherein the material can form active cement component through low temperature calcining. The calcination of the material for second feeding is achieved in the kiln hood and the grate cooler, and the calcined material together with the clinker unloaded from the kiln head are cooled and jointly form the cement clinker admixture of the present invention. The activity of the material like calcined coal gangue, etc. is higher than that of general cement admixture due to the rapid calcining and rapid cooling, therefore the clinker usage amount decreases in grinding and preparing cement with same quality and thus the cement output increases.

Generally, the highest temperature of second calcining is not higher than 1200° C. and not lower than 700° C. The preferred calcining temperature range is from about 750° C. to 1100° C. Particularly, the calcining temperature may vary depending on the particular material for second feeding.

Feeding material for the second time can be carried out through one or more feeder noses provided at the side and/or upper part of the kiln hood, or through one or more feeder noses provided on a position on the grate cooler adjacent to the kiln hood. Of course, feeding also may be carried out through the feeder noses provided at the both positions if necessary. The skilled person in this field may set up the feeder nose according to the practical production conditions only if it may realize the production process of the present invention.

The material after being fed through the feeder nose will tumble down together with the high temperature clinker unloaded from the rotary kiln, and relatively evenly tiled on the surface of the high temperature clinker unloaded from the kiln head, and move forwardly with the grate cooler.

Preferentially, the material for second feeding shall have certain thermal value and can be calcined and form active cement component through lower temperature calcining. The material can be mainly selected from industrial waste residue, slag, mining waste, etc., such as coal gangue, stone coal, and it also can be clay, river and lake mud, shale, waste muck, etc. In addition, carbonic material such as fault coal, stone coal, waste graphite, peat, etc. may be added in a suitable quantity as required, in order to supplement the thermal value of the material. Moreover, calcium raw material such as slaked lime, carbide slag, etc. also may be added in a suitable quantity to supplement the insufficient calcium content of the material. In existing technologies, process of cement production at low temperature with coal gangue as the main raw material has been disclosed in many literatures, which may be partially cited for reference only. It is believed that those with ordinary skill in the field can obtain the composition ratio of the material of the present invention with the main raw materials selected according to the local conditions after understanding the core technical scheme of the present invention. Of course, all these material ratio schemes finished for realizing the purpose of the present invention are within the protection range required by the present invention.

The present invention preferably selects coal gangue as the main raw material for the second and caicining. Coal gangue is a kind of rock with a lower carbonic content mixed up with coal seams, which is harder than coal, and is used as a generic term of the solid waste discharged from coal mining and coal washing process. Due to its chemical components of silicon, calcium and carbon, and even more, because the composition of the coal gangue from some mines is similar to that of cement raw material, coal gangue can be directly crushed and used as the material for second feeding of the present invention. Of course, it may enlarge the selection range of coal gangue if using coal gangue as the main raw material when suitable supplementation of calcium raw material and/or carbonic raw material are added, and increase the adding quantity of coal gangue, so as to increase cement output.

The present invention also may use clay, river and lake mud, shale, waste muck, etc. as the main raw materials for the second feeding. The example of utilization of river and lake mud also shows sound results. Generally, this kind of raw material has a carbon content of zero or has very low carbon content, i.e. no thermal value is contained and so it is necessary to add materials with a high thermal value, such as fault coal etc., high thermal value coal gangue and the like.

Obviously, it also can realize the purposes of the present invention with other wastes of industrial and mineral industry or urban construction as the main raw material for second feeding, or with the combination of one or more of them as the main raw materials for second feeding according to the teaching of the present invention.

Generally, the material for second feeding and calcining of the present invention only need to be crushed into certain grain diameter without the energy consumption process procedures like grinding, steam curing, pre-decomposition, etc.

For example, conventional crusher is used to crush the material to be the grains with the maximum grain diameter of about less than 5 cm, preferably less than about 2 cm, and preferably the maximum grain diameter is less than about 2 cm.

The amount of the material for calcining of the present invention is about 1% to 100% (weight) of the clinker unloaded from the rotary kiln. The yield-increasing effect will not be obvious if the feeding amount is too small, and the quality of the cement of the present invention may be decreased if the feeding amount is too large. The preferred amount of the material for second feeding and calcining of the present invention is about 5% to 70% (weight) of the clinker unloaded from the rotary kiln. It is to be appreciated that using an amount of over 70%, even over 100% or more of the clinker is also possible according to the teaching of the present invention, depending on the quality of the material fed. Any amounts are feasible and are within the protection scope of the present invention, provided that it would not obviously lower the cement quality or decrease the amount of the total cement admixture.

The material for second feeding and calcining of the present invention preferentially shall have certain thermal value, and as expressed in calorific value, the thermal value contained is generally within the range of about 100 KJ/kg to 12000 KJ/kg. If the thermal value is too low, after feeding the material, the second air temperature would be compromised, the calcining coal consumption in rotary kiln would be increased and the waste heat power generation would be decreased. If the thermal value is too high, the high thermal value will result in partial over-sintering, and an over high temperature will produce a very adverse influence on the quality of the clinker unloaded from the rotary kiln which needs to be cooled in the grate cooler. Some of the material for second feeding and calcining of the present invention may be directly applied without any other carbonic material added. However, broadly speaking, adding suitable amounts of carbonic materials will enhance the application and broaden the alternative range of the main raw material. In summary, those with ordinary skill in this field may carry out the present invention by controlling the thermal value of the material for second feeding and calcining in a proper range according to the teaching of the present invention.

The second feeding and calcining of the present invention will be finished with the moving forward of the grate cooler. Generally, its operating speed need not be adjusted in an especially complicated way, but the air volume and air speed in respective segments of the grate cooler may be properly adjusted for fully calcining the material for second feeding and calcining. What need to be specially explained is that in fact, the material for second feeding and calcining is tiled on the surface of the high temperature clinker unloaded from the kiln head in a relative even way, while the cool air in the grate cooler blows from down to up. The cool air cools the high temperature clinker when blowing through the unloading material layer, and simultaneously provides oxygen combustion supporting for the second calcining carried out on the its surface or facilitates high temperature heating. It will not create any adverse influence on the cooling process of the unloaded material due to the upward air supply and upward second calcining flame, which is exactly the ingenious and non-obvious point of the present invention. Another extraordinary accompanying effect is that when the material for second feeding and calcining contains combustibles, its combustion and heating increase the temperature of the air supply to the rotary kiln and decomposition furnace, thereby reducing the coal consumption of clinker sintering, meanwhile, increasing the capacity of the waste heat power generation.

The present invention may be carried out via following process procedures with coal gangue as the material for second feeding and calcining and with the prevailing cement rotary kiln production line apparatus as an example according to the detailed embodiment of the present invention:

The cement raw material enters the rotary kiln through a decomposition furnace after pre-processing, and becomes calcined clinker after high temperature calcining in the rotary kiln, and then enters the grate cooler from the kiln head for quenching treatment. Feeder nose(s) is provided on the kiln hood of the rotary kiln, through which the coal gangue after pre-processing will be sent into the grate cooler. The coal gangue, i.e. the material for second feeding and calcining will tumble down with the unloaded clinker from the rotary kiln, and tile onto the high temperature surface of the clinker unloaded from the kiln head in a relative even way, so as to form a material layer of coal gangue, which will be forwardly conveyed with the conveyor of the grate cooler. At this time, as coal gangue will be combusted at a temperature of 700° C. to 1000° C., the coal gangue tiled would combusted and be calcined, i.e. undergoing a "feeding and calcining" due to the high temperature of the unloaded high-temperature calcining clinker. The coal gangue after being calcined becomes the active components of the cement. In addition, the calcining also can obviously increase the second air temperature which enters the rotary kiln and decomposition furnace as well as the third air temperature used for waste heat power generation, so as to greatly save the coal consumption of kiln head and decomposition furnace, and the heat produced during its calcining can further increase the capacity of waste heat power generation.

Figure 3:
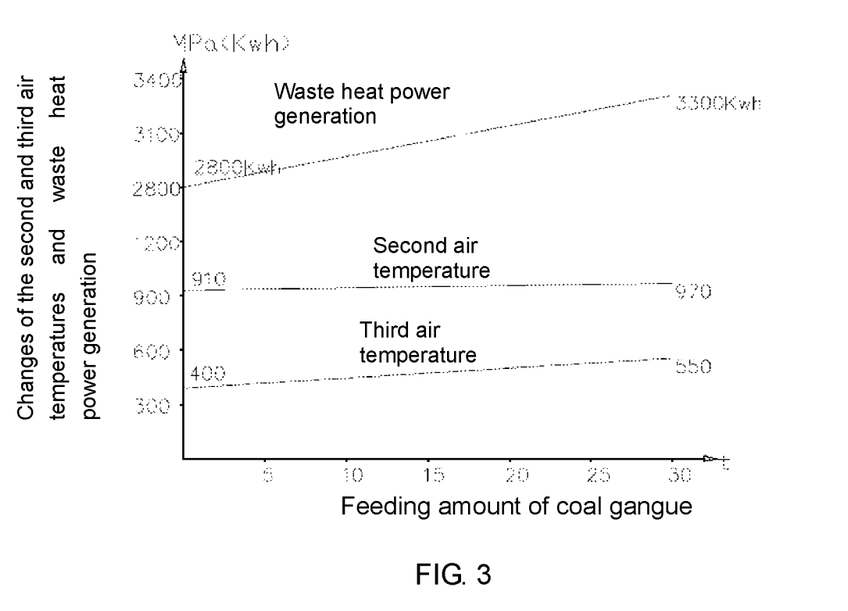
FIG. 3 is a curve diagram showing the changes of the second air temperature, the third air temperature and the capacity of waste heat power generation versus different amounts of coal gangue which is used alone as the material for the second feeding and calcining.
Figure 4:
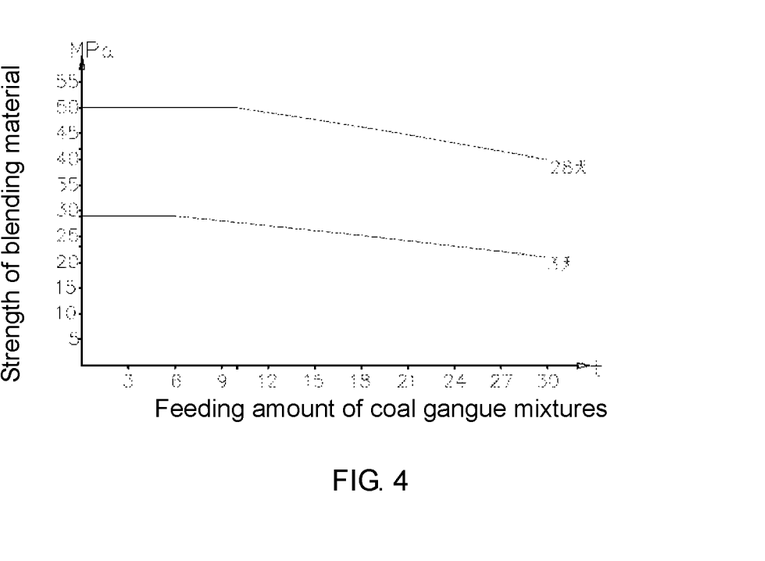
FIG. 4 is a curve diagram showing the influence on the strength of the cement of the present invention by different amounts of coal gangue mixtures.

Compared with the existing techniques, the production process of the present invention mainly comprises the opening provided at the rotary kiln hood, through which the crushed coal gangue, shale, stone coal, peat, etc. which can form active cement components may be added from the upper part of the grate cooler, i.e. outside of the kiln head. These materials are blended with the high temperature clinker after being calcined. The materials will be rapidly calcined on the upper part of the high temperature clinker in the grate cooler with the heat of the clinker, and will be rapidly cooled, forming active cement component with very high activity, thereby forming the cement admixture with the clinker and increasing the cement output. Meanwhile, the temperature of the air entering the rotary kiln and the decomposition furnace as well as the temperature of the air used for waste heat power generation is obviously increased due to the heat produced by calcining and spontaneous combustion of the materials, so as to greatly save the kiln head coal and decomposition furnace coal, and increase the waste heat power generating capacity (see FIGS. 3 and 4). Coal with lower calorific value may be used to replace coal with higher calorific value especially in the area with significant price difference between coal with low calorific value and coal with high calorific value. For example, the coal with 5000 kilocalories is used to replace the coal with 5500 kilocalorie to greatly decrease the purchase cost of the coal; moreover, anthracite may be used to replace soft coal due to the increase of the temperature of the second air and the third air, which can greatly save the purchase cost in the area with large price difference between anthracite and soft coal.

Besides above technical effects, the present invention at least also has the following beneficial effect:

(1) The material for second calcining added in the present invention may adopt the materials with low utilization value produced in industrial and mineral industry, like coal gangue, fault coal, shale, stone coal or peat, waste soil, etc., therefore, it may obviously decrease the cement production cost, and greatly increase the output value of cement industry;

(2) The production process of the present invention may be carried out by providing one or more feeder nose(s) through which material can be feed from outside of the kiln head for second calcining at the existing cement production apparatus. Therefore, the apparatus improvement process is simple.

BRIEF DESCRIPTION OF THE DRAWINGS

Embodiments and beneficial effects of the present invention are described in details combined with the accompanying drawings as follows, wherein.

DETAILED DESCRIPTION OF THE PREFERRED EMBODIMENTS

The present invention will be described in details by reference to the following embodiments. It should be understood that the following embodiments are only used to describe the present invention and do not limit the range of the present invention in any forms.

Example 1

Using Coal Gangue as Material for Second Feeding and Calcining

Now coal gangue is used as the material for second feeding and calcining to describe the cement production process of the present invention.

Figure 1:
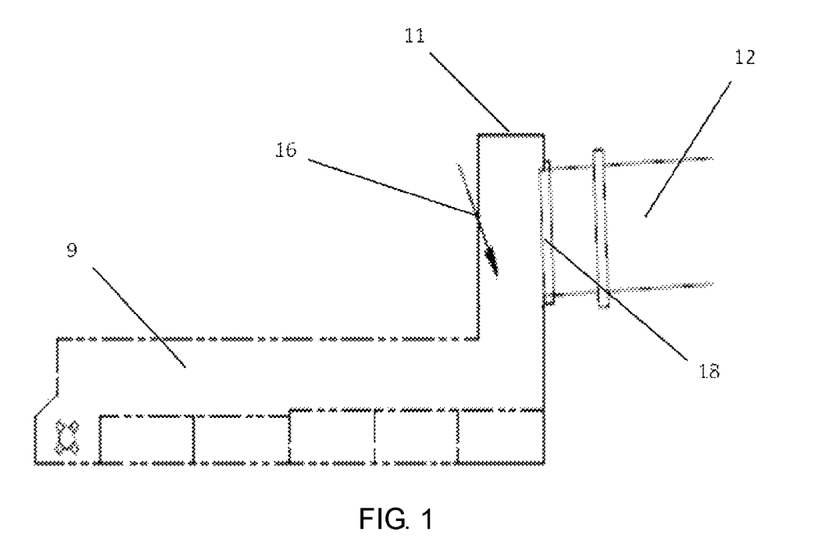
FIG. 1 is a schematic view of rotary kiln cement production apparatus of the present invention, in which 12 is a rotary kiln, 11 is a kiln hood, 9 is a grate cooler, 16 is a feeder nose, and 18 is a kiln head; and arrow means the direction for the material for second feeding and calcining entering the kiln hood.

As illustrated in FIG. 1, the rotary kiln cement production apparatus of the present invention comprises a rotary kiln (12), a kiln hood (11), a grate cooler (9), a feeder nose (16), a material conveying device (17), a kiln head (18), and a stock bin (19).

While the clinker upon high temperature calcining in the rotary kiln entering the grate cooler through the kiln hood, coal gangue with average heat of 1600 KJ/kg was fed from the feeder nose (16) with a feeding amount of 25% by weight of the output of the clinker upon high temperature calcining in the rotary kiln, and the coal gangue had been crushed into grains with a diameter less than 2 cm in advance. The fed coal gangue were tumbled down onto the grate cooler together with the high temperature clinker unloaded from the rotary kiln and tiled on the upper part of the surface of the high temperature clinker unloaded from the kiln head in a relatively even way, and moved forwardly with the grate cooler. At that time, cool air was blown into the lower part of the grate cooler from down to up through the material layer, so as to cool the high temperature clinker. The coal gangue fed for second calcining was rapidly heated and calcined with the action of high temperature and oxygen and then was rapidly cooled in the grate cooler, because of the high temperature of 900° C. to 1200° C. of the clinker unloaded from the rotary kiln and the blown-in cool air which further provided oxygen supporting combustion.

Coal gangue was separated after being calcined, and its chemical composition was analyzed and shown in following Table 1.

TABLE 1

| Loss on ignition | $SiO_2$ | $Al_2O_3$ | $Fe_2O_3$ | CaO | MgO | Σ (%) |
|---|---|---|---|---|---|---|
| 1.91 | 51.18 | 14.57 | 4.91 | 19.57 | 2.42 | 94.66 |

According to above process, different amounts of Coal gangue were fed from outside of the kiln head and calcined, to measure the properties of the blending material obtained. See Table 2 for the feeding conditions. 3% gypsum was added into the blending material when strength was measured. The measurements of each sample in Table 2 were shown in Table 3.

TABLE 2

| | Feeding conditions | | | |
|---|---|---|---|---|
| No. | Clinker (Part by weight) | Coal gangue (Part by weight) | Thermal value of coal gangue (KJ/kg) | Diameter of coal gangue crushed in advance (cm) |
| 1 | 100 | 0 | | |
| 2 | 95 | 5 | 1600 | ≦2 |
| 3 | 85 | 15 | 1600 | ≦2 |
| 4 | 80 | 20 | 1600 | ≦2 |
| 5 | 70 | 30 | 1600 | ≦2 |
| 6 | 60 | 40 | 1600 | ≦2 |
| 7 | 50 | 50 | 1600 | ≦2 |

The materials for second feeding and calcining had been crushed in advance, and about 90% of the grains obtained were less than 2 cm in diameter, and the remaining of them were less than 5 cm in diameter. Materials used in the following Examples were crushed into grains in the same diameter as those in this Example.

TABLE 3

| | Test results of the properties of the blending material | | | | | |
|---|---|---|---|---|---|---|
| | Rupture strength (Mpa) | | Compression strength (Mpa) | | Setting time (min) | |
| No. | 3 days | 28 days | 3 days | 28 days | Initial set | Final set |
| 1 | 6.0 | 9.0 | 30.1 | 53.4 | 165 | 220 |
| 2 | 5.8 | 8.9 | 29.0 | 52.1 | 165 | 225 |
| 3 | 5.6 | 8.8 | 27.0 | 49.8 | 169 | 230 |
| 4 | 5.5 | 8.6 | 25.9 | 47.5 | 180 | 240 |
| 5 | 5.2 | 8.0 | 23.5 | 43.5 | 200 | 250 |
| 6 | 4.6 | 7.3 | 21.0 | 40.2 | 205 | 270 |
| 7 | 3.9 | 6.3 | 17.0 | 37.8 | 210 | 300 |

Compression strength and rupture strength in this Example and the following Examples were measured according to national standard GB175-2007.

In addition, take PC32.5 cement as an example, the clinker used can be decreased from originally 580 kg/ton to 500 kg/ton under the same strength requirements for the cement, i.e. 80 kg standard clinker is saved for each ton of cement.

The ratio of the components of the present cement admixture is shown in following Table 4.

TABLE 4

| Blending material (coal gangue 20%, clinker 80%) | Desulphurization gypsum | Limestone | Coal ash and slag |
|---|---|---|---|
| 588 kg | 30 kg | 80 kg | 312 kg |

The original ratio is shown in following Table 5.

TABLE 5

| Pure clinker through calcination | Desulphurization gypsum | Limestone | Coal ash and slag |
|---|---|---|---|
| 580 kg | 30 kg | 80 kg | 310 kg |

Properties of the grinded cement are shown in following Table 6.

TABLE 6

| Compression strength (Mpa) | | Rupture strength (Mpa) | | Setting time | | Other properties |
|---|---|---|---|---|---|---|
| 3 days | 28 days | 3 days | 28 days | Initial set | Final set | |
| 18.6 | 38.3 | 3.9 | 8.0 | 188 min | 226 min | Qualified |

Practical application proves that take production of PC32.5 cement as an example, cement output increased 16% on the previous basis, and benefit increase is achieved based on reduced cost.

Moreover, further following technical effects have been achieved by feeding coal gangue for second calcining:

1. The second air temperature had gone up by 60° C. in average, so total soft coal for calcining previously used can be replaced by a mixture of 60% soft coal and 40% anthracite for calcining.

2. The third air temperature (used for waste heat power generation) had gone up by 100° C., resulting in an increase of power generation by clinker to 43° from 37° for each ton of clinker.

3. 5 tons of coal had been daily saved.

Meanwhile, above techniques had been applied in the production line with daily capacity of 1800 tons of clinker in Luzhou Lanliang Cement Co., Ltd. with the practical effect of decreasing cost as follows:

1. Anthracite was used to replace part of soft coal with a price difference of 100 Yuan/ton, replacing 160 tons/day in total. 16000 Yuan/day was saved.

2. Coal was saved by 5 tons/day with 900 Yuan for each ton of coal, and 4500 Yuan/day was saved in total.

3. Waste heat power generating capacity was increased by 10000 KWH, and 6500 Yuan was saved.

4. Due to the lower purchase cost of coal gangue than that of blending material (coal ash, etc.), 40 Yuan/ton and 11000 Yuan/day were saved.

5. 144 tons of standard clinker were saved, equal to 28800 (200 Yuan/ton×144) Yuan.

Above measures totally realized production cost decrease of 66800 Yuan/day.

Coal gangue with a thermal value of just 1600 KJ/kg was used in the above application, and the amount of the coal gangue used was only 20% by weight of the total blending material. The cost saving would be more obvious in the area where has a rich coal gangue resource and a large price difference between common active blending material (such as coal ash) and coal gangue, or a larger amount of coal gangue is used.

Example 2

Using Shale as Material for Second Feeding and Calcining

The same process and apparatus in Example 1 were adopted, except that while the clinker upon high temperature calcining in the rotary kiln entering the grate cooler through the kiln hood, shale was fed from the feeder nose (16) as the material for second feeding and calcining. After second calcining, measure the properties of the blending material obtained. See Table 7 for the feeding conditions. 3% gypsum was added into the blending material when strength was measured. The measurements of each sample in Table 7 were shown in Table 8.

TABLE 7

| | Feeding conditions | | | |
|---|---|---|---|---|
| No. | Clinker (Part by weight) | Shale (Part by weight) | Thermal value of shale (KJ/kg) | Diameter of Shale crushed in advance (cm) |
| 1 | 100 | 0 | | |
| 2 | 80 | 20 | 0 | ≤2 |
| 3 | 60 | 40 | 0 | ≤2 |

TABLE 8

Test results of the properties of the blending material

| | Rupture strength (Mpa) | | Compression strength (Mpa) | | Setting time (min) | |
|---|---|---|---|---|---|---|
| No. | 3 days | 28 days | 3 days | 28 days | Initial set | Final set |
| 1 | 6.0 | 9.0 | 30.1 | 53.4 | 165 | 220 |
| 2 | 5.3 | 8.2 | 25.0 | 46.0 | 185 | 245 |
| 3 | 4.0 | 6.6 | 18.0 | 38.1 | 215 | 280 |

Example 3

Using Peat as Material for Second Feeding and Calcining

The same process and apparatus in Example 1 were adopted, except that while the clinker upon high temperature calcining in the rotary kiln entering the grate cooler through the kiln hood, peat was fed from the feeder nose (16) as the material for second feeding and calcining. After second calcining, measure the properties of the blending material obtained. See Table 9 for the feeding conditions. 3% gypsum was added into the blending material when strength was measured. The measurements of each sample in Table 9 were shown in Table 10.

TABLE 9

Feeding conditions

| No. | Clinker (Part by weight) | Peat (Part by weight) | Thermal value of peat (KJ/kg) | Diameter of peat crushed in advance (cm) |
|---|---|---|---|---|
| 1 | 100 | 0 | | |
| 2 | 80 | 20 | 1500 | ≤2 |
| 3 | 60 | 40 | 1500 | ≤2 |

TABLE 10

Test results of the properties of the blending material

| | Rupture strength (Mpa) | | Compression strength (Mpa) | | Setting time (min) | |
|---|---|---|---|---|---|---|
| No. | 3 days | 28 days | 3 days | 28 days | Initial set | Final set |
| 1 | 6.0 | 9.0 | 30.1 | 53.4 | 165 | 220 |
| 2 | 5.4 | 8.3 | 25.2 | 46.3 | 185 | 247 |
| 3 | 4.2 | 6.8 | 18.3 | 38.5 | | |

TABLE 11

Feeding conditions

| No. | Clinker (Part by weight) | Stone coal (Part by weight) | Thermal value of stone coal (KJ/kg) | Diameter of stone coal crushed in advance (cm) |
|---|---|---|---|---|
| 1 | 100 | 0 | 2400 | |
| 2 | 80 | 20 | 2400 | ≤2 |
| 3 | 60 | 40 | 2400 | ≤2 |

TABLE 12

Test results of the properties of the blending material

| | Rupture strength (Mpa) | | Compression strength (Mpa) | | Setting time (min) | |
|---|---|---|---|---|---|---|
| No. | 3 days | 28 days | 3 days | 28 days | Initial set | Final set |
| 1 | 6.0 | 9.0 | 30.1 | 53.4 | 165 | 220 |
| 2 | 5.4 | 8.4 | 25.8 | 47.3 | 180 | 235 |
| 3 | 4.3 | 6.9 | 18.4 | 38.7 | 185 | 250 |

Example 4

Using Stone Coal as Material for Second Feeding and Calcining

The same process and apparatus in Example 1 were adopted, except that while the clinker upon high temperature calcining in the rotary kiln entering the grate cooler through the kiln hood, stone coal was fed from the feeder nose (16) as the material for second feeding and calcining. After second calcining, measure the properties of the blending material obtained. See Table 11 for the feeding conditions. 3% gypsum was added into the blending material when strength was measured. The measurements of each sample in Table 11 were shown in Table 12.

Example 5

Using Coal Gangue and Other Materials as the Material for Second Feeding and Calcining The same process and apparatus in Example 1 were adopted, except that while the clinker upon high temperature calcining in the rotary kiln entering the grate cooler through the kiln hood, a mixture of coal gangue and other materials was fed from the feeder nose (16) as the material for second feeding and calcining. After second calcining, measure the properties of the blending material obtained. See Table 13 for the feeding conditions. 3% gypsum was added into the blending material when strength was measured. The measurements of each sample in Table 13 were shown in Table 14.

TABLE 13

Feeding conditions

| No. | Clinker (Part by weight) | Material for second calcining (Part by weight) | Thermal value of material for second calcining (KJ/kg) | Diameter of material for second calcining crushed in advance (cm) |
|---|---|---|---|---|
| 1 | 100 | | | |
| 2 | 80 | 20 (Part by weight among coal gangue, shale and stone coal was 1:1:1) | 1400 | ≤2 |
| 3 | 60 | 40 (Part by weight among coal gangue, shale and stone coal was 1:1:1) | 1400 | ≤2 |

TABLE 14

Test results of the properties of the blending material

| No. | Rupture strength (Mpa) 3 days | Rupture strength (Mpa) 28 days | Compression strength (Mpa) 3 days | Compression strength (Mpa) 28 days | Setting time (min) Initial set | Setting time (min) Final set |
|---|---|---|---|---|---|---|
| 1 | 6.0 | 9.0 | 30.1 | 53.4 | 165 | 220 |
| 2 | 5.4 | 8.4 | 25.7 | 47.2 | 180 | 235 |
| 3 | 4.2 | 6.8 | 18.5 | 38.6 | 185 | 250 |

Example 6

Using Fault Coal and Other Materials as the Material for Second Feeding and Calcining The same process and apparatus in Example 1 were adopted, except that while the clinker upon high temperature calcining in the rotary kiln entering the grate cooler through the kiln hood, a mixture of fault coal and other materials was fed from the feeder nose (16) as the material for second feeding and calcining. After second calcining, measure the properties of the blending material obtained. See Table 15 for the feeding conditions. 3% gypsum was added into the blending material when strength was measured. The measurements of each sample in Table 15 were shown in Table 16.

TABLE 15

Feeding conditions

| No. | Clinker (Part by weight) | Material for second calcining (Part by weight) | Thermal value of material for second calcining (KJ/kg) | Diameter of material for second calcining crushed in advance (cm) |
|---|---|---|---|---|
| 1 | 100 | | | |
| 2 | 80 | 20 (Part by weight between fault coal and shale was 3:7) | 9000 (Thermal value of fault coal) | ≤2 |
| 3 | 60 | 40 (Part by weight between fault coal and shale was 3:7) | 9000 (Thermal value of fault coal) | ≤2 |

TABLE 16

Test results of the properties of the blending material

| No. | Rupture strength (Mpa) 3 days | Rupture strength (Mpa) 28 days | Compression strength (Mpa) 3 days | Compression strength (Mpa) 28 days | Setting time (min) Initial set | Setting time (min) Final set |
|---|---|---|---|---|---|---|
| 1 | 6.0 | 9.0 | 30.1 | 53.4 | 165 | 220 |
| 2 | 5.3 | 8.3 | 25.5 | 47 | 180 | 240 |
| 3 | 4.1 | 6.6 | 18.4 | 38.0 | 190 | 260 |

Example 7

Influence on the Strength of the Blending Material and Energy Utilization Efficiency by Material for Second Feeding and Calcining The same process and apparatus in Example 1 were adopted to measure the influence on the strength of the blending material as well as on changes of the second air temperature, the third air temperature and the capacity of waste heat power generation by different amounts of coal gangue for second feeding. See FIG. 2-4 for the results.

Figure 2:
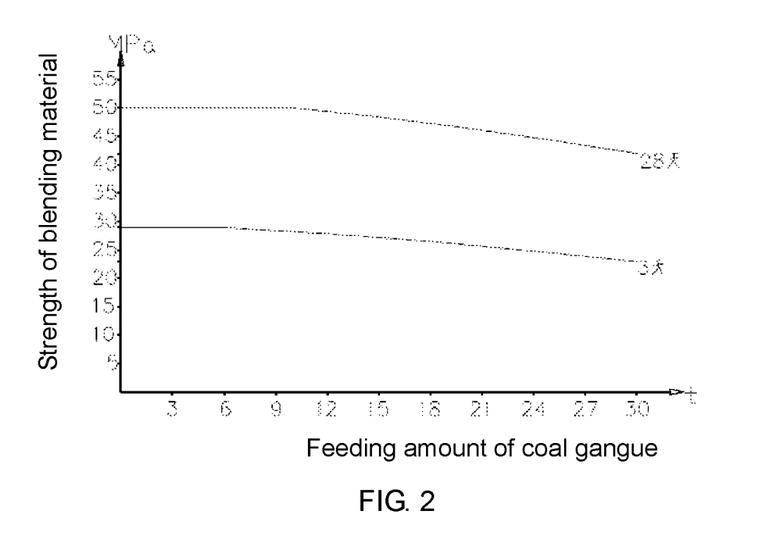
FIG. 2 is a curve diagram showing the influence on the strength of the blending material of the present invention by different amounts of coal gangue which is used alone as the material for the second feeding and calcining.

It can be seen from the Figures that, the material fed for second calcining would combine with the high temperature clinker upon calcining, and it would be rapidly calcined on the upper part of the high temperature clinker in the grate cooler with the heat of the clinker, forming active cement component with very high activity, thereby forming a cement admixture with the clinker and increasing the cement output. Meanwhile, the strength of the blending material was hardly compromised (FIG. 2). Further, the temperature of the air entering the rotary kiln and the decomposition furnace as well as the temperature of the air used for waste heat power generation is obviously increased due to the heat produced by calcining and spontaneous combustion of the materials, so as to greatly save the kiln head coal and decomposition furnace coal, and increase the waste heat power generating capacity.

Example 8

Using Sludge of Sewage Treatment Plant as Material for Second Feeding and Calcining The same process and apparatus in Example 1 were adopted, except that while the clinker upon high temperature calcining in the rotary kiln entering the grate cooler through the kiln hood, sludge of sewage treatment plant was fed from the feeder nose (16) as the material for second feeding and calcining, wherein the sludge had been dehydrated to have a water content of 15% before fed. After second calcining, measure the properties of the blending material obtained. Feeding conditions and measurement results were shown in Table 17 and Table 18, respectively.

TABLE 17

Feeding conditions

| No. | Clinker (Part by weight) | Sludge of sewage treatment plant (Part by weight) | Thermal value of sludge (KJ/kg) |
|---|---|---|---|
| 1 | 100 | | |
| 2 | 80 | 20 | 1800 |
| 3 | 60 | 40 | 1850 |

TABLE 18

| | Rupture strength (Mpa) | | Compression strength (Mpa) | | Setting time (min) | |
|---|---|---|---|---|---|---|
| No. | 3 days | 28 days | 3 days | 28 days | Initial set | Final set |
| 1 | 5.8 | 8.9 | 29.1 | 52.4 | 155 | 210 |
| 2 | 5.5 | 8.5 | 26.7 | 48.2 | 170 | 225 |
| 3 | 4.6 | 7.0 | 19.5 | 39.6 | 180 | 260 |

What is claimed:

1. A process for making a cement clinker by feeding unground raw material outside of a kiln head comprising:
   a) feeding at least one unground raw material selected from the group consisting of coal gangue, oil shale, stone coal, clay, river and lake mud, waste muck, sewage sludge, and peat from outside the kiln head with a cement clinker from high temperature calcining from about 1250° C. to 1450° C. in a rotary kiln as the cement clinker is simultaneously entering a grate cooler via a kiln hood, the raw material forming an active cement component through low temperature calcining at a temperature from 700° C. to 1200° C. and has a thermal value of 100 KJ/kg to 12,000 KJ/kg; and
   b) cooling the low temperature calcined raw material that is mixed together with the high temperature calcined cement clinker to jointly form a cement clinker admixture.

2. The process according to claim 1, wherein the unground raw material is one or more of coal gangue, stone coal, and peat.

3. The process according to claim 1, wherein the unground raw material is coal gangue.

4. The process according to claim 1, characterized in that feeding raw material from outside of the kiln head is introduced at the kiln hood and/or at a position on the grate cooler adjacent to the kiln hood.

5. The process according to claim 1, wherein the feeding raw material from outside the kiln head is 1% to 100% by weight of the cement clinker from the high temperature calcining in the rotary kiln.

6. The process according to claim 5, wherein the feeding raw material from outside the kiln head is 5% to 70% by weight of the cement clinker from the high temperature calcining in the rotary kiln.

7. The process according to claim 1, wherein the maximum grain diameter of the unground raw material is less than 5 cm.

8. The process according to claim 7, wherein the maximum grain diameter of the unground raw material is less than 2 cm.

9. The process according to claim 1, wherein the raw material further comprises a second raw material is one or more of stone coal, fault coal, waste coke, peat, and waste graphite.

10. The process according to 1, further comprising a third raw material effective to increase calcium content in the raw material mixture.

11. The process according to claim 10, wherein the third raw material is one of slaked lime or carbide slag.

12. The process according to claim 1, wherein the low temperature calcining is from 750° C. to 1100° C.

* * * * *